(12) United States Patent
Akoum et al.

(10) Patent No.: US 11,432,290 B2
(45) Date of Patent: *Aug. 30, 2022

(54) FACILITATION OF SIGNAL ALIGNMENT FOR 5G OR OTHER NEXT GENERATION NETWORK

(71) Applicant: AT&T Intellectual Property I, L.P., Atlanta, GA (US)

(72) Inventors: Salam Akoum, Austin, TX (US); Milap Majmundar, Austin, TX (US); Ralf Bendlin, Cedar Park, TX (US); Arunabha Ghosh, Austin, TX (US); Thomas Novlan, Cedar Park, TX (US); Xiaoyi Wang, Austin, TX (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/319,030

(22) Filed: May 12, 2021

(65) Prior Publication Data

US 2021/0266889 A1 Aug. 26, 2021

Related U.S. Application Data

(63) Continuation of application No. 16/361,402, filed on Mar. 22, 2019, now Pat. No. 11,019,627.

(Continued)

(51) Int. Cl.
*H04W 72/04* (2009.01)
*H04W 72/08* (2009.01)

(Continued)

(52) U.S. Cl.
CPC ........ *H04W 72/046* (2013.01); *H04B 7/0695* (2013.01); *H04B 7/088* (2013.01);
(Continued)

(58) Field of Classification Search
CPC ............... H04W 72/046; H04W 16/28; H04W 72/082; H04W 88/085; H04W 92/20; H04B 7/0695; H04B 7/088; H04B 7/15507
See application file for complete search history.

(56) References Cited

U.S. PATENT DOCUMENTS 9,979,456 B1 5/2018 Akoum et al.
2017/0324459 A1 11/2017 Koskela et al.
(Continued)

OTHER PUBLICATIONS

AT&T, et al. "New SID Proposal: Study on Integrated Access and Backhaul for NR." 8881123GPP TSG RAN Meeting #75, Dubrovnik, Croatia, Mar. 6-9, 2017. 5 pages.
(Continued)

*Primary Examiner* — Omer S Mian
(74) *Attorney, Agent, or Firm* — Amin, Turocy & Watson, LLP

(57) ABSTRACT

To facilitate signal alignment for an integrated access backhaul (IAB) node, a system can determine a subset of beams that can be used for communication transmissions. Based on a signal quality associated with the subset of beams, the system can indicate that the subset of beams is to be used for the communication transmission. Consequently, the subset of the beams or another subset of the subset of the beams can be utilized for the communication transmission based on the signal quality of the beams.

20 Claims, 12 Drawing Sheets

Related U.S. Application Data

(60) Provisional application No. 62/738,536, filed on Sep. 28, 2018.

(51) Int. Cl.
  *H04W 16/28* (2009.01)
  *H04B 7/06* (2006.01)
  *H04B 7/08* (2006.01)
  *H04B 7/155* (2006.01)

(52) U.S. Cl.
  CPC ........ *H04B 7/15507* (2013.01); *H04W 16/28* (2013.01); *H04W 72/082* (2013.01)

(56) References Cited

U.S. PATENT DOCUMENTS

| | | |
|---|---|---|
| 2017/0331670 A1 | 11/2017 | Parkvall et al. |
| 2018/0034515 A1 | 2/2018 | Guo et al. |
| 2018/0049042 A1 | 2/2018 | Yu et al. |
| 2018/0092139 A1 | 3/2018 | Novlan et al. |
| 2018/0132217 A1 | 5/2018 | Stirling-Gallacher |
| 2018/0167883 A1 | 6/2018 | Guo et al. |
| 2018/0199212 A1 | 7/2018 | Lin et al. |
| 2018/0206132 A1 | 7/2018 | Guo et al. |
| 2018/0212651 A1 | 7/2018 | Li et al. |
| 2018/0241452 A1 | 8/2018 | Akkarakaran et al. |
| 2018/0288755 A1 | 10/2018 | Liu et al. |
| 2018/0294863 A1 | 10/2018 | Nilsson |
| 2019/0386726 A1* | 12/2019 | Fresia .................. H04B 7/0695 |
| 2020/0053800 A1* | 2/2020 | Deng .................... H04W 24/08 |
| 2020/0067590 A1* | 2/2020 | Wang .................... H04B 17/318 |
| 2020/0084792 A1* | 3/2020 | Khoryaev ............. H04W 76/23 |
| 2020/0100290 A1* | 3/2020 | Mundarath ........... H04W 24/08 |

OTHER PUBLICATIONS

Office Action dated Jul. 9, 2020 for U.S. Appl. No. 16/361,402, 34 pages.

* cited by examiner

FACILITATION OF SIGNAL ALIGNMENT FOR 5G OR OTHER NEXT GENERATION NETWORK

CROSS-REFERENCE TO RELATED APPLICATIONS

The subject patent application is a continuation of, and claims priority to, U.S. patent application Ser. No. 16/361,402, filed Mar. 22, 2019, and entitled "FACILITATION OF SIGNAL ALIGNMENT FOR 5G OR OTHER NEXT GENERATION NETWORK," which applications each claim the benefit of priority to U.S. Provisional Patent Application No. 62/738,536, filed Sep. 28, 2018 and titled "FACILITATION OF SIGNAL ALIGNMENT FOR 5G OR OTHER NEXT GENERATION NETWORK", the entireties of which applications are incorporated herein by reference.

TECHNICAL FIELD

This disclosure relates generally to facilitating signal alignment. For example, this disclosure relates to utilizing transmission beam sweeping to facilitate signal alignment for a 5G, or other next generation network.

BACKGROUND $5^{th}$ generation (5G) wireless systems represent a next major phase of mobile telecommunications standards beyond the current telecommunications standards of $4^{th}$ generation (4G). Rather than faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of things, aiming at lower cost, lower battery consumption, and lower latency than 4G equipment.

The above-described background relating to facilitating signal alignment is merely intended to provide a contextual overview of some current issues, and is not intended to be exhaustive. Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
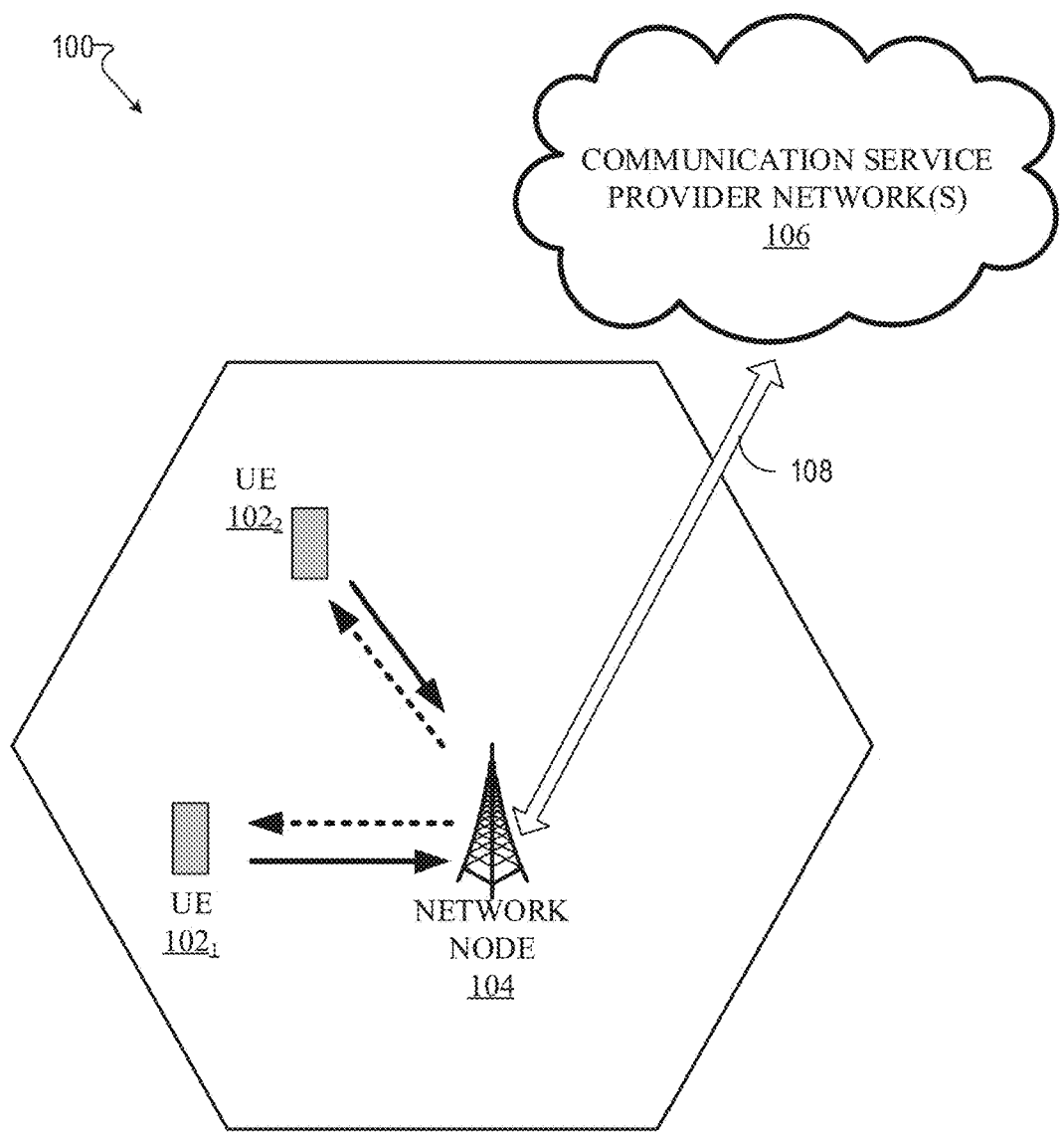
FIG. 1 illustrates an example wireless communication system in which a network node device (e.g., network node) and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate signal alignment for a 5G or other next generation networks. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate signal alignment for a 5G network. Facilitating signal alignment for a 5G network can be implemented in connection with any type of device with a connection to the communications network (e.g., a mobile handset, a computer, a handheld device, etc.) any Internet of things (TOT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception.

In some embodiments the non-limiting term radio network node or simply network node is used. It can refer to any type of network node that serves UE is connected to other network nodes or network elements or any radio node from where UE receives a signal. Examples of radio network nodes are Node B (NB), base station (BS), multi-standard radio (MSR) node such as MSR BS, eNode B, network controller, radio network controller (RNC), base station controller (BSC), relay, donor node controlling relay, base transceiver station (BTS), access point (AP), transmission points, transmission nodes, RRU, RRH, nodes in distributed antenna system (DAS) etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with, or take the place of policy and charging rules function ("PCRF") network elements so that policies such as quality of service and traffic management and routing can be synchronized and managed end to end.

To meet the huge demand for data centric applications, 4G standards can be applied 5G, also called new radio (NR) access. 5G networks can comprise the following: data rates of several tens of megabits per second supported for tens of thousands of users; 1 gigabit per second can be offered simultaneously to tens of workers on the same office floor; several hundreds of thousands of simultaneous connections can be supported for massive sensor deployments; spectral efficiency can be enhanced compared to 4G; improved coverage; enhanced signaling efficiency; and reduced latency compared to LTE. In multicarrier system such as OFDM, each subcarrier can occupy bandwidth (e.g., subcarrier spacing). If the carriers use the same bandwidth spacing, then it can be considered a single numerology. However, if the carriers occupy different bandwidth and/or spacing, then it can be considered a multiple numerology.

Due to the expected larger bandwidth available for NR compared to LTE (e.g. mmWave spectrum) along with the native deployment of MIMO or multi-beam systems in NR, integrated access and backhaul links can be developed and deployed. This can allow for deployment of a dense network of self-backhauled NR cells in an integrated manner by building upon control and data channels/procedures defined for providing access to UEs. An example illustration of a network with such integrated access and backhaul links can comprise a relay node (Relay DU) that can multiplex access and backhaul links in time, frequency, or space (e.g. beam-based operation).

While an integrated access backhaul (IAB) can be deployed in a standalone architecture where the access UEs and relay DUs receive both control and data bearers on NR, it is also possible to support IAB operation under a non-standalone (NSA) architecture where the control plane signalling is sent over LTE or another NR anchor carrier (e.g., sub6-GHz).

In an exemplary protocol stack structure for an IAB node, if the backhaul links carrying relay traffic (Ur) are based on the same channels and protocols as the access links carrying user data traffic (Uu), then it is possible to construct the IAB node as containing two parallel protocol stacks, one containing a UE function or also called a mobile termination (MT) function, which provides connectivity between the IAB node and a lower order IAB node or donor node which has a wired connection to the core network. The other IAB node functionality can be the gNode B (gNB) function or distributed unit (Du) function, which can provide connectivity between the IAB node and a higher order IAB node or access UEs.

In order to route the relay data traffic within the IAB node, in one example, an adaptation layer can be inserted above a radio link control (RLC) of both the UE and gNB functions of the IAB node. In other examples the adaptation layer can be inserted above the medium access control (MAC) and packet data control protocol (PDCP) layers. In addition to data routing, the IAB node can manage the control plane signalling and configurations for both the UE and gNB functions. An example control plan signalling for the UE function can involve a radio resource control (RRC) and an F1 interface and operations administration and maintenance (OAM) for the gNB function. This coordination can be performed internally in the IAB node by an IAB control (IAB-C) interface.

The control plane configuration of the UE and gNB functions can be performed at the parent IAB node if it is a donor gNB, or it can be forwarded from the parent IAB node across one or more backhaul link hops from a central configuration entity or entities (e.g., at the gNB central-unit (CU) or RAN/OAM controller).

This disclosure describes the functionality of the JAB control interface for configuring radio resource management (RRM) measurements and reports for IAB nodes. The IAB nodes can multiplex the access and backhaul links in time, frequency, or space (e.g. beam-based operation), which can comprise the transmission of signals and/or channels utilized as part of initial access and measurements used for radio resource management. The same physical layer signals and channels used for these purposes by access UEs can be reused for performing similar procedures at the IAB node. However, the IAB nodes can have both gNB functionality as well as UE functionality. Thus, the IAB node gNB function can transmit signals and channels used for initial access and/or radio resource management (RRM) as well as receive reports from connected devices, which can be both access UEs and higher order IAB nodes. At the same time, due to the hierarchical topology used for IAB, the UE function of the IAB node can perform measurements and send measurement reports to higher order parent nodes (e.g., IAB nodes or donor nodes). Thus, a common framework can be used for the RRM configuration for IAB nodes.

Due to a half-duplexing constraint, IAB nodes can: 1) receive on the access link and/or backhaul link at any given time, and 2) transmit on the access link and/or backhaul link at any given time. As a result, while the same physical signals can be used for both UE and IAB nodes. Different configurations of the resources and/or transmission period(s) of the signals used for initial access for access UEs and IAB nodes can be used. In addition, since the UE functionality for IAB nodes is not fully identical with access UEs (e.g. optimized physical layer parameters, support for control plane messaging related to relay route/topology management), the network should be able to identify which UEs performing initial access are normal access UEs or IAB nodes with UE functionality. Also, the parameters configuring RRM operation at the IAB node gNB function can consider the half-duplex constraint imposed by the UE function and can also take into account hop order and other topology/route management functionalities.

During an initial configuration with the network, the IAB node UE function can perform initial access procedures (e.g., synchronization signal detection and random access procedure) to connect to one or potentially multiple parent IAB nodes. In one example, parameters for initial access such as one or more cell IDs of parent nodes, synchronization signal block (SSB) indices, synchronization measurement timing configurations (SMTC), and other parameters can be preconfigured or signalled by an anchor carrier (e.g., LTE). However, it can be beneficial for the IAB nodes to support self-discovery of IAB parent nodes and become integrated into the network topology without the need for planning or pre-configuration. In this case, the IAB nodes can perform blind detection of the SSBs upon initial power-up. Once the IAB node UE function is connected to the network (e.g. in RRC connected mode), the network can provide an updated measurement configuration or SMTC for the IAB node UE, which can comprise the timing of SSB transmissions (including periodicity) and/or a list of SSB indices (e.g., bitmap) that the UE can utilize for performing RRM measurements, which can be used for topology/route management or mobility in case of mobile relay node operations.

When a receiving node is configured with a non-zero power (NZP) CSI-RS resource set configured with repetition 'on', the receiving node can measure on the same transmission beam (e.g., transmission beam with the same spatial transmission filter) sent over multiple orthogonal frequency division multiplexing (OFDM) symbols. For the purposes of reception beam selection and measurement, the beams at the receiving node can be grouped into subsets, in a tree structure format, whereas each group can comprise multiple subgroups. The grouping can correspond, for example, to different antenna panels, and/or different effective angle directions, such that the sum of all groups constitute the entirety of the beams to be swept. The grouping can have multiple granularities (e.g., 2 groups, 4 groups, etc.). The grouping can also correspond to different beam widths (e.g., narrow vs. wide beams), reference signal associations (e.g., SSB or NZP-CSI-RS resource configuration), transmission source/quasi-colocation (QCL) (e.g. group 1 corresponds to TRP transmission point (TRP 1/Cell 1/DU 1, group 2 corresponds to TRP2/Cell 2/DU 2 depending on the multi-TRP, or a multi-connectivity option used by the network), and/or interference hypotheses (e.g. each group corresponds to a different set of interfering nodes).

In one embodiment, the receiver can report on the group that the best reception beam corresponds to an information element indicating the group. This procedure can be performed via the following steps: 1) the receiving node sweeps the receiving beam groups following a beam management procedure; 2) when the UE finds the best receiving beam, the UE can send an indication to the network of the subset restriction or the group associated with the strongest receiving beam, wherein the indication can be in the form of an information bit indicating the group (e.g., 1 bit to indicate group 1 or group 2), and wherein the determination of the best receiving beam can be based on a reference signal received power (RSRP) or a metric that takes interference into account (e.g., signal interference to noise ratio (SINR), reference signal received quality (RSRQ)) to mitigate the effect of cross link interference; 3) the receiving node can report on the reception beam group restriction that the best receiving beam belongs to a new report configuration that is configured for a repetition 'on' beam management procedure, along with a SINR report, if needed; 4) when the network triggers a new beam management procedure, receiving beam sweeping (e.g., NZP-CSI-RS resource set with repetition 'on') can be performed following the indication from the receiver of the receiving beam group, thus minimizing the overhead for receiving beam alignment, wherein the network can also maintain a memory of the previous receiving beam group reports, such that the repetition is done for a receiving beam subset chosen based on a predictive metric that takes into account the most recent report, in addition to the past report trends, and wherein the network can also choose to perform the beam sweeping based on a larger group size or different group/subset; and 5) within the group indicated by the network, the receiver can report on a subgroup, so that the receiving beams are further restricted, thus increasing granularity, wherein the subgroup reporting, given the group indicated by the network, can be differential, resulting in a very small feedback overhead (e.g., 1 bit reporting); and wherein the subgroup reporting can be indicated in a new report.

In another embodiment, the receiver can feed back the repetition order to the network, such that the repetition order can indicate how many OFDM symbols the network needs to transmit with repetition 'on'. For example, if the receiver has 4 receiving beams, then the repetition order needed to sweep all the beams is 4, if the beams are grouped into 2 subgroups of 2, and the receiver indicates a repetition order of 2, then only 2 OFDM symbols are needed perform beam sweeping for a particular subgroup. The following steps describe the procedure with repetition order feedback: 1) the receiving node can sweep the receiving beam groups following a normal beam management procedure; 2) when the UE finds the best receiving beam, the UE can send an indication to the network of the subset restriction or the subgroup that it found to have the strongest receiving beam, wherein this indication can also be in the form of a repetition order, indicating to the base station the number of OFDM symbols repetition 'on' needs to be performed for, and wherein the determination of the best receiving beam can be based on RSRP or a metric that takes interference into account (SINR, RSRQ) to mitigate the effect of cross link interference; 3) the receiving node can report on the receiving beam group restriction that the best receive beam belongs to a new report configuration that is configured for the repetition 'on' beam management procedure, along with a SINR report; and 4) when the network triggers a new beam management procedure, receiving beam sweeping (e.g., NZP-CSI-RS resource set with repetition 'on') can be performed following the indication from the receiver on the Rx beam subset, thus minimizing the overhead of receiving beam alignment, wherein the network can also maintain a memory of the previous receiving beam group reports, such that the repetition is performed for a reception beam subset chosen based on a predictive metric that takes into account the most recent report, in addition to the past report trends, and wherein the network can also choose to do the beam sweeping based on a larger repetition order.

In one embodiment, described herein is a method comprising identifying, by a wireless network device comprising a processor, reception beams of a network based on a mobile device function. In response to the identifying the reception beams, the method can comprise determining, by the wireless network device, a group of the reception beams, fewer than the reception beams, of the network based on a quality of the group of the reception beams. In response to the identifying the group of the reception beams, the method can comprise sending, by the wireless network device, to a gNodeB function, an indication of the group of the reception beams to the network. In response to the sending the indication of the group of the reception beams, the method can comprise initiating, by the wireless network device, a transmission beam alignment associated with the gNodeB function.

According to another embodiment, a system can facilitate identifying a signal based on a quality associated with the signal of signals of a wireless network. In response to the identifying the signal, the system can comprise sending a first indication representative of the signal to a network device of the wireless network. In response to the sending the first indication of the signal, the system can comprise generating a second indication that the signal is to be used for a transmission between a transmission device of the wireless network and a reception device of the wireless network.

In yet another embodiment, described herein is a machine-readable medium that can perform the operations comprising identifying first signals of a group of signals and second signals of the group of signals, wherein the first signals are different than the second signals. In response to the identifying the first signals and the second signals, the machine-readable medium can perform the operations comprising determining that the first signals are associated with a first quality and the second signals are associated with a second quality, wherein the first quality is greater than the second quality. Based on the first quality being determined to be greater than the second quality, the machine-readable medium can perform the operations comprising sending, an indication of the first signals and initiating a transmission signal alignment in response to the sending the indication of the first signals.

These and other embodiments or implementations are described in more detail below with reference to the drawings.

Referring now to FIG. 1, illustrated is an example wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 gigahertz (Ghz) and 300 Ghz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
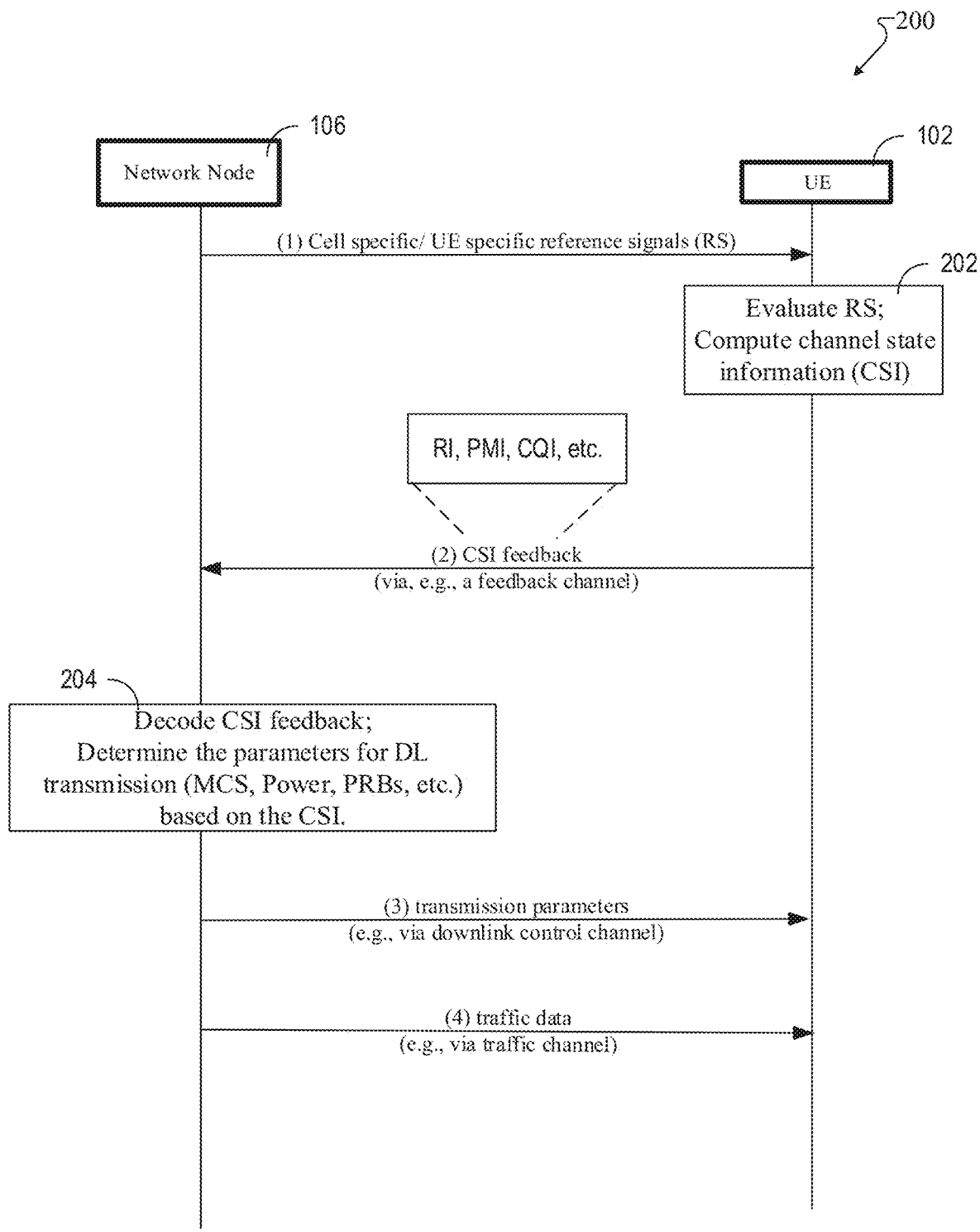
FIG. 2 illustrates an example schematic system block diagram of a message sequence chart between a network node and UE according to one or more embodiments.

Referring now to FIG. 2, illustrated is an example schematic system block diagram of a message sequence chart between a network node and user equipment according to one or more embodiments. FIG. 2 depicts a message sequence chart for downlink data transfer in 5G systems 200. The network node 104 can transmit reference signals to a user equipment (UE) 102. The reference signals can be cell specific and/or user equipment 102 specific in relation to a profile of the user equipment 102 or some type of mobile identifier. From the reference signals, the user equipment 102 can compute channel state information (CSI) and compute parameters needed for a CSI report at block 202. The CSI report can comprise: a channel quality indicator (CQI), a pre-coding matrix index (PMI), rank information (RI), a CSI-resource indicator (e.g., CRI the same as beam indicator), etc.

The user equipment 102 can then transmit the CSI report to the network node 104 via a feedback channel either on request from the network node 104, a-periodically, and/or periodically. A network scheduler can leverage the CSI report to determine downlink transmission scheduling parameters at 204, which are particular to the user equipment 102. The scheduling parameters 204 can comprise modulation and coding schemes (MCS), power, physical resource blocks (PRBs), etc. FIG. 2 depicts the physical layer signaling where the density change can be reported for the physical layer signaling or as a part of the radio resource control (RRC) signaling. In the physical layer, the density can be adjusted by the network node 104 and then sent over to the user equipment 102 as a part of the downlink control channel data. The network node 104 can transmit the scheduling parameters, comprising the adjusted densities, to the user equipment 102 via the downlink control channel. Thereafter and/or simultaneously, data can be transferred, via a data traffic channel, from the network node 104 to the user equipment 102.

Figure 3:
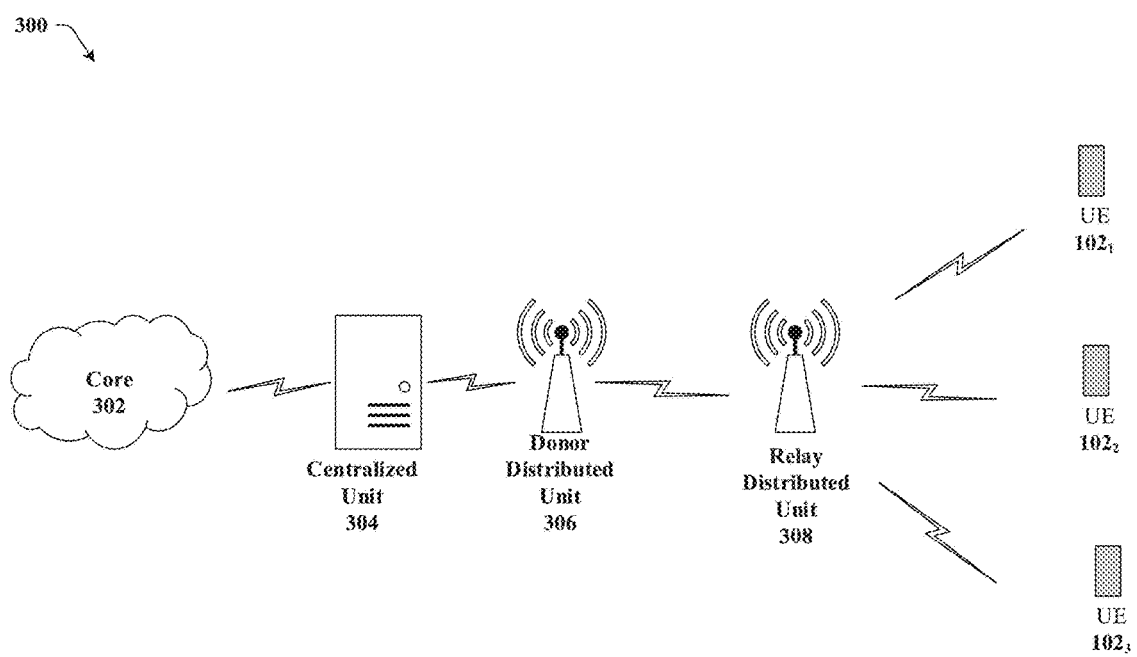
FIG. 3 illustrates an example schematic system block diagram of an integrated access backhaul link according to one or more embodiments.

Referring now to FIG. 3, illustrated is an example schematic system block diagram of integrated access and backhaul links according to one or more embodiments. For example, the network 300, as represented in FIG. 3 with integrated access and backhaul links, can allow a relay node to multiplex access and backhaul links in time, frequency, and/or space (e.g. beam-based operation). Thus, FIG. 3 illustrates a generic IAB set-up comprising a core network 302, a centralized unit 304, a donor distributed unit 306, a relay distributed unit 308, and UEs 1021, 1022, 1023. The donor distributed unit 306 (e.g., access point) can have a wired backhaul with a protocol stack and can relay the user traffic for the UEs 1021, 1022, 1023 across the IAB and backhaul link. Then the relay distributed unit 308 can take the backhaul link and convert it into different strains for the connected UEs 1021, 1022, 1023. Although FIG. 3 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 304, but in a real time application part of the protocol stack, the RLC, the MAC, and the PHY can be co-located with the base station wherein the system can comprise an F1 interface. In order to add relaying, the F1 interface can be wireless so that the same structure of the donor distributed unit 306 can be kept.

Figure 4:
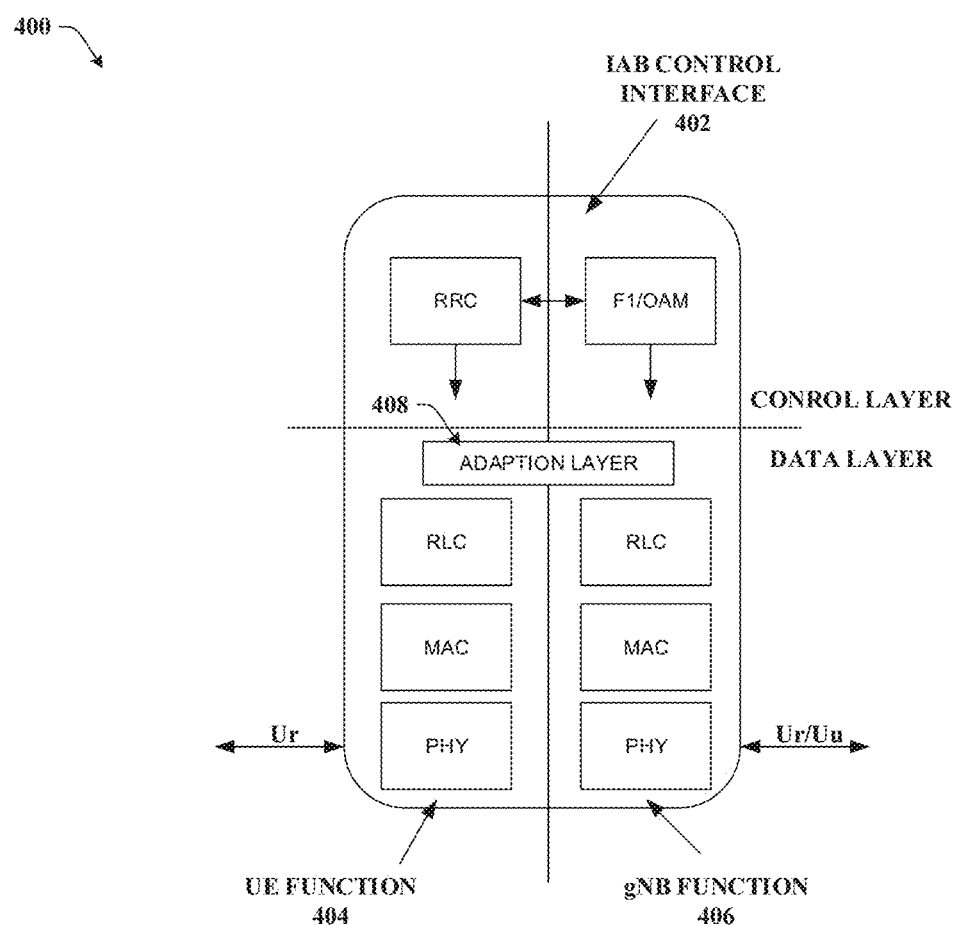
FIG. 4 illustrates an example schematic system block diagram of an integrated access backhaul link node protocol stack according to one or more embodiments.

Referring now to FIG. 4, illustrated is an example schematic system block diagram of an integrated access backhaul (IAB) node 400 protocol stack according to one or more embodiments. If the backhaul links carrying relay links (Ur) are based on the same channels and protocol as the access links carrying user data traffic (Uu), then the IAB node 400 can receive relay links (Ur) in the same manner that a UE receives and processes relay links. For example, the data traffic from the UE function 404 can transition up to the adaption layer 408 and then transition down to the gNode B function 406 of the IAB node 400. From there the data can be sent to another user or to another backhaul node if there are additional hops. The UE function 404 can provide connectivity between the IAB node 400 and a lower IAB node or donor node, which has a wired connection to the core network. The gNode B function 406 (e.g., distributed unit function) can provide connectivity between the IAB node 400 and a higher order IAB node or access UEs. With reference to FIG. 3, The IAB node 400 protocol stack can be between the donor distributed unit 306 and the relay distributed unit 308. An IAB control interference 402 can be introduced because the UE function 404 can be configured by the network and typically uses RRC signaling for the configuration. However, the gNode B function 406 (relay distributed unit 308) can be controlled by the F1/OAM. Thus, a separate protocol stack can be leveraged for the gNode B function 406 and the IAB control interface 402 can connect the UE function 404 to the gNode B function 406 to can coordinate radio resources.

The IAB node 400 can comprise many antennas, akin to that of a DU for transmission and reception. An equal number of antennas at the transmitter and the receiver in an integrated access and backhaul network can allow a plethora of massive MIMO functionality that may not be possible with a gNB to UE access link.

Beam management procedures can acquire and maintain a set of transmission and/or reception beams that can be used for downlink and/or uplink transmission and/or reception. Beam management can be used in mmWave systems where channels can suffer from a blockage effect due to smaller wavelengths and/or objects around a user, including the user's body. The narrower beamforming of NR also makes this effect more obvious.

Receiver beamforming can be used to overcome the blockage effect (e.g., reduce user self-blockage). This principle can comprise switching receiver antenna weighting factors to adjust the effective receiving angle. Based on the aforementioned data, the UE can adaptively find the propagation path, which is blocked and then adapt to a separate propagation path. To assist the UE in identifying the signal quality from different reception beams, a receiver beam training procedure is introduced. The receiver beam training procedure can also be called CSI-RS transmission with repetition 'ON'. The receiver beam training procedure can repeat CSI-RS transmissions from the same transmission beam multiple times so the UE receiver can sweep the IAB node 400 receiver beam to find the best one.

Figure 5:
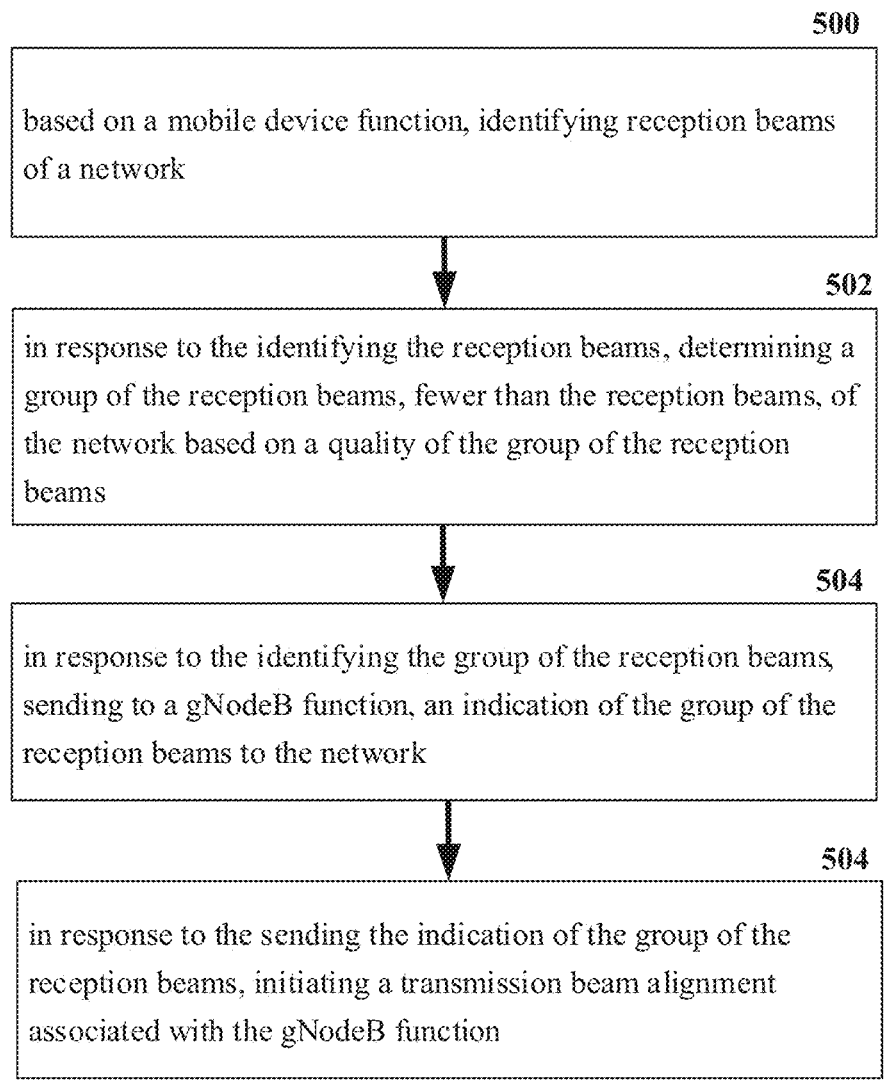
FIG. 5 illustrates an example flow diagram for a method for facilitation of signal alignment.

Referring now to FIG. 5 illustrates an example flow diagram for a method for facilitation of signal alignment. At element 500, a method can comprise identifying (e.g., via the IAB node 400) reception beams of a network based on a mobile device function (e.g., UE function 404). In response to the identifying the reception beams, at element 502, the method can comprise determining (e.g., via the IAB node 400) a group of the reception beams, fewer than the reception beams, of the network based on a quality of the group of the reception beams. In response to the identifying the group of the reception beams, at element 504, the method can comprise sending (e.g., via the IAB node 400), to a gNodeB function 406, an indication of the group of the reception beams to the network. Additionally, in response to the sending the indication of the group of the reception beams, at element 506, the method can comprise initiating (e.g., via the IAB node 400) a transmission beam alignment associated with the gNodeB function 406.

Figure 6:
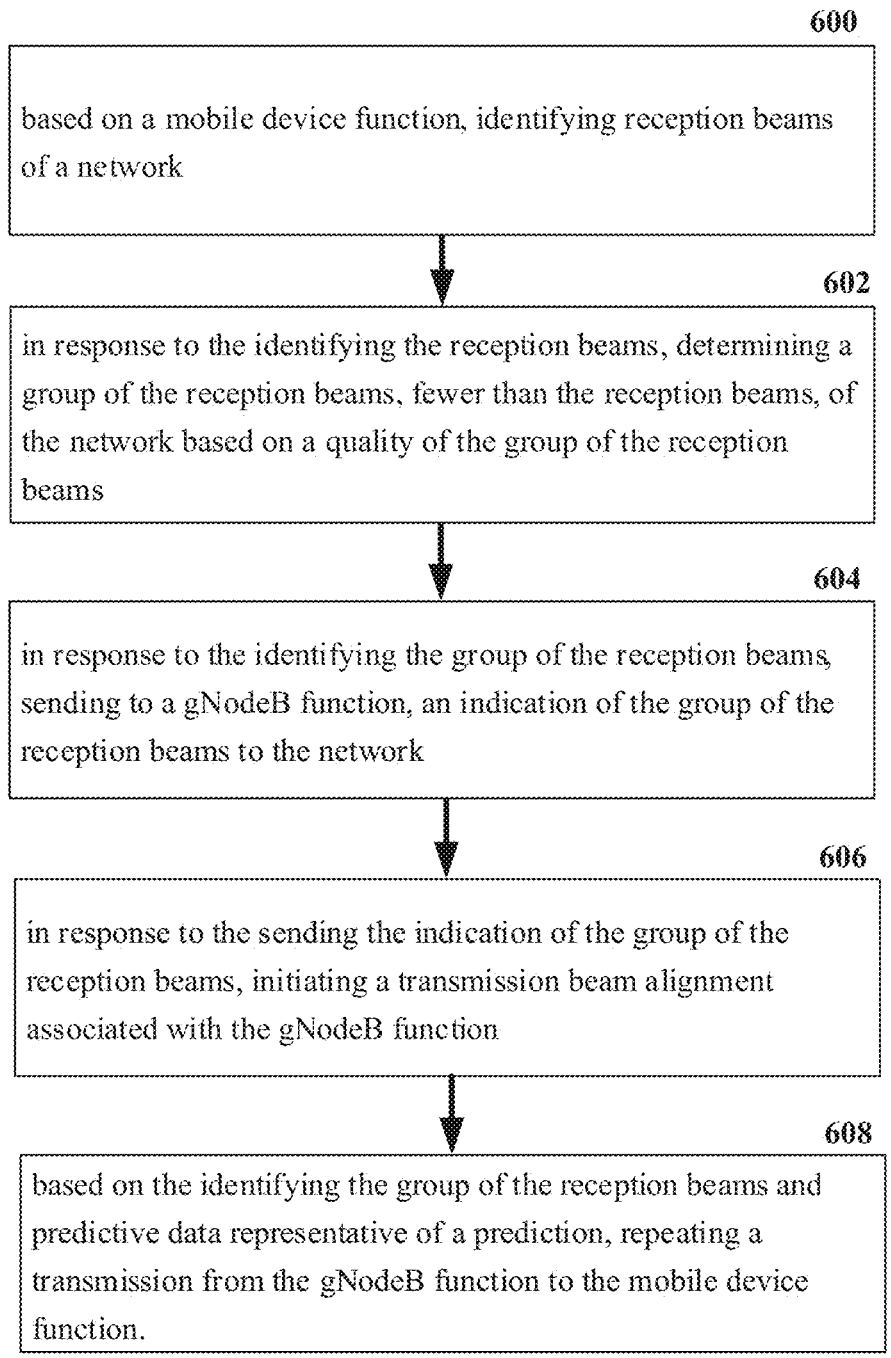
FIG. 6 illustrates an example flow diagram for a method for facilitation of signal alignment.

Referring now to FIG. 6, illustrates an example flow diagram for a method for facilitation of signal alignment. At element 600, a method can comprise identifying (e.g., via the IAB node 400) reception beams of a network based on a mobile device function (e.g., UE function 404). In response to the identifying the reception beams, at element 602, the method can comprise determining (e.g., via the IAB node 400) a group of the reception beams, fewer than the reception beams, of the network based on a quality of the group of the reception beams. In response to the identifying the group of the reception beams, at element 604, the method can comprise sending (e.g., via the IAB node 400), to a gNodeB function 406, an indication of the group of the reception beams to the network. Additionally, in response to the sending the indication of the group of the reception beams, at element 606, the method can comprise initiating (e.g., via the IAB node 400) a transmission beam alignment associated with the gNodeB function 406. Furthermore, at element 608, based on the identifying the group of the reception beams and predictive data representative of a prediction, repeating (e.g., via the IAB node 400) a transmission from the gNodeB function 406 to the mobile device function (e.g., UE function 404).

Figure 7:
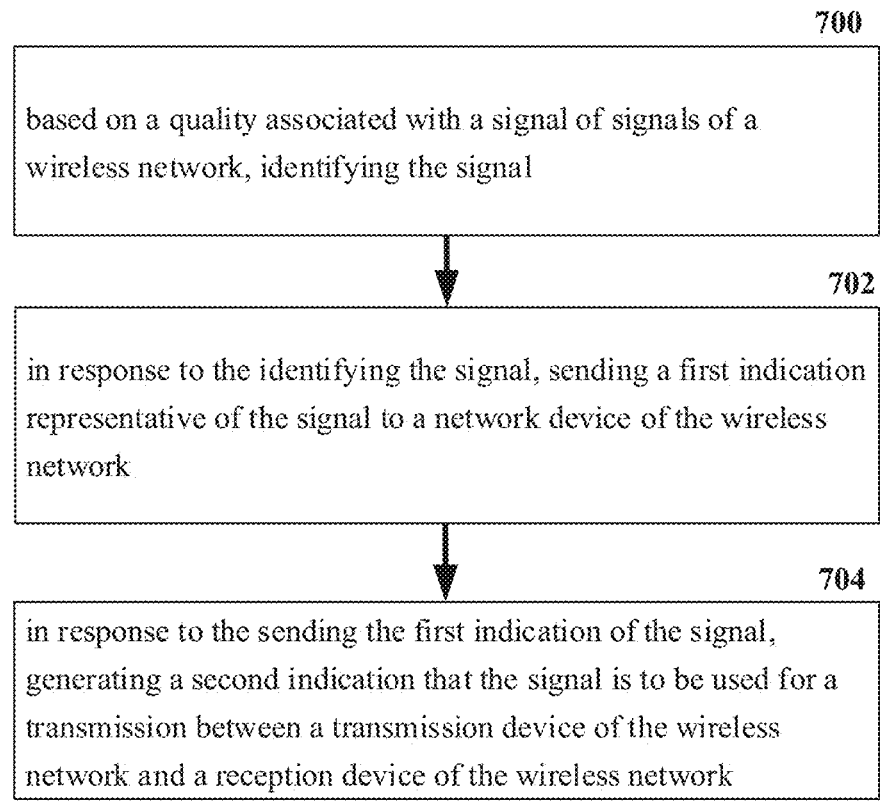
FIG. 7 illustrates an example flow diagram for a system for facilitation of signal alignment.

Referring now to FIG. 7, illustrates an example flow diagram for a system for facilitation of signal alignment. At element 700, a system can facilitate identifying (e.g., via the IAB node 400) a signal based on a quality associated with the signal of signals of a wireless network. In response to the identifying the signal, at element 702, the system can comprise sending (e.g., via the IAB node 400) a first indication representative of the signal to a network device of the wireless network. In response to the sending the first indication of the signal, at element 704, the system can comprise generating (e.g., via the IAB node 400) a second indication that the signal is to be used for a transmission between a transmission device of the wireless network and a reception device of the wireless network.

Figure 8:
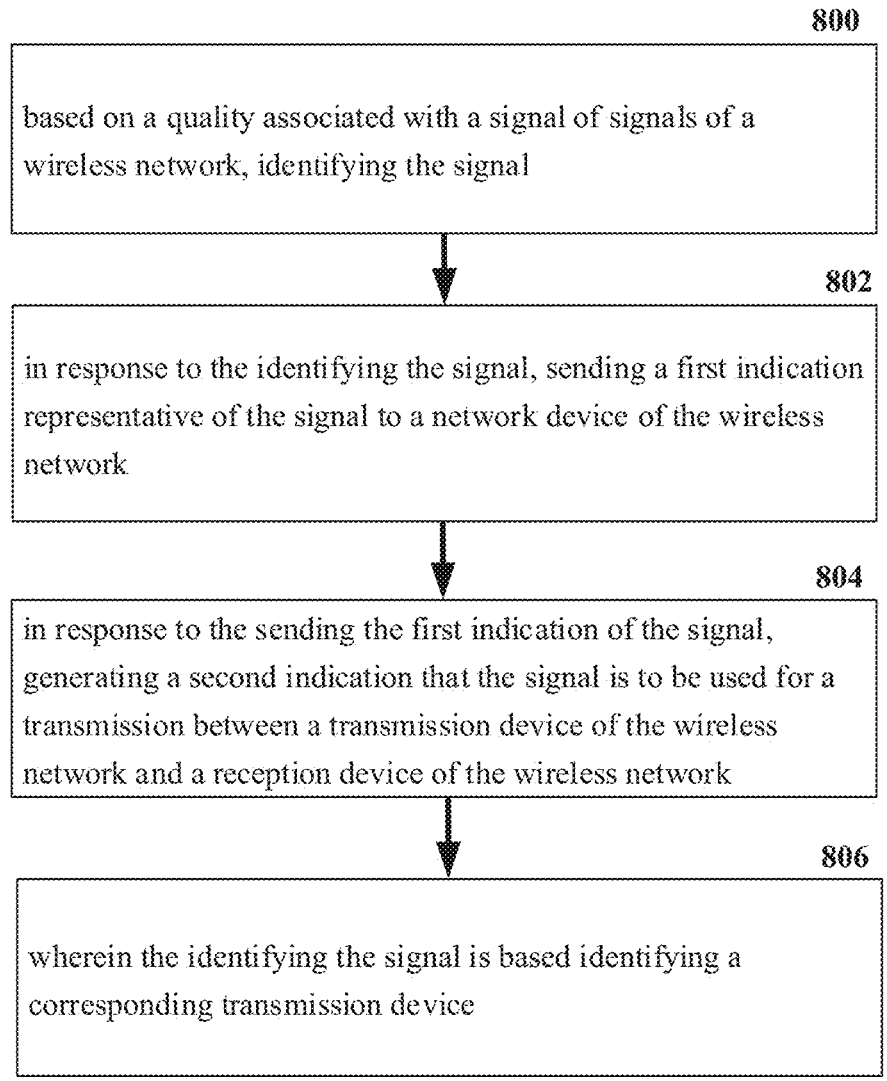
FIG. 8 illustrates an example flow diagram for a system for facilitation of signal alignment.

Referring now to FIG. 8, illustrates an example flow diagram for a system for facilitation of signal alignment. At element 800, a system can facilitate identifying (e.g., via the IAB node 400) a signal based on a quality associated with the signal of signals of a wireless network. In response to the identifying the signal, at element 802, the system can comprise sending (e.g., via the IAB node 400) a first indication representative of the signal to a network device of the wireless network. In response to the sending the first indication of the signal, at element 804, the system can comprise generating (e.g., via the IAB node 400) a second indication that the signal is to be used for a transmission between a transmission device of the wireless network and a reception device of the wireless network. Furthermore, at element 804, the identifying the signal is based on identifying a corresponding transmission device.

Figure 9:
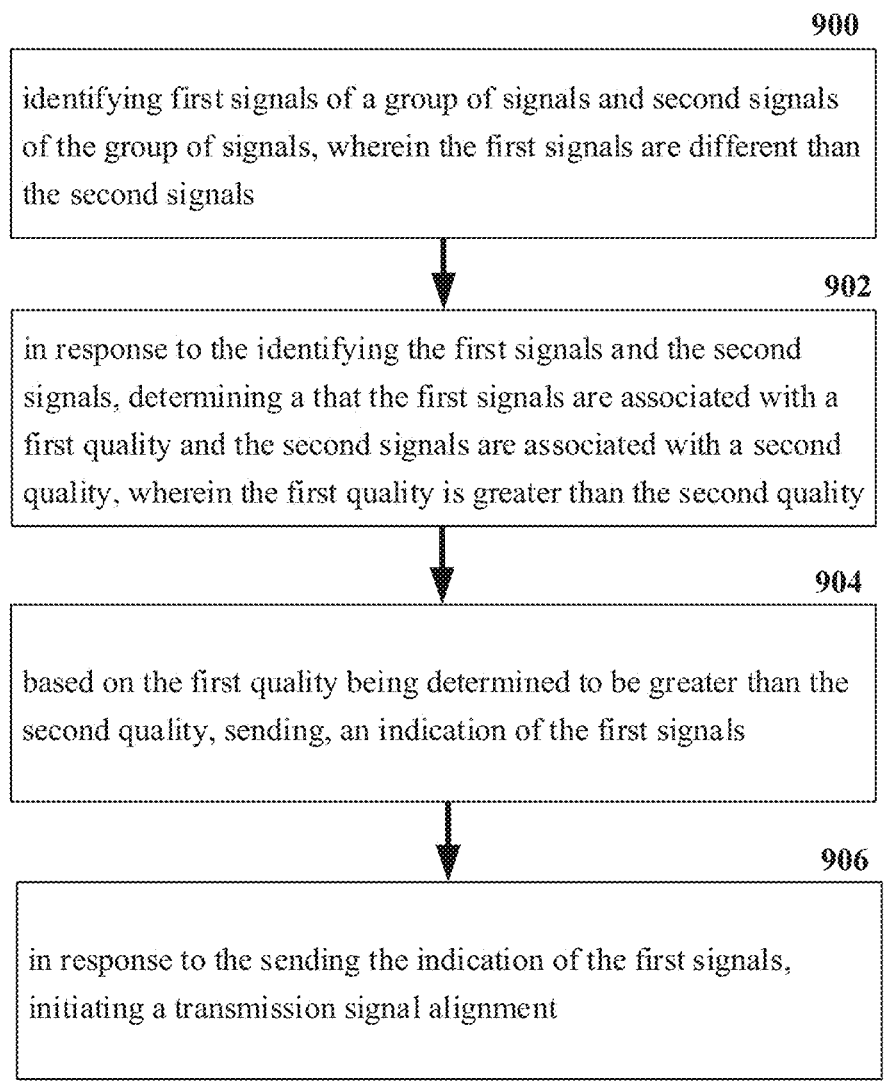
FIG. 9 illustrates an example flow diagram for a machine-readable medium for facilitation of signal alignment.

Referring now to FIG. 9, illustrates an example flow diagram for a machine-readable medium for facilitation of signal alignment. At element 900, a machine-readable medium can perform the operations comprising identifying (e.g., via the IAB node 400) first signals of a group of signals and second signals of the group of signals, wherein the first signals are different than the second signals. In response to the identifying the first signals and the second signals, at element 902 the machine-readable medium can perform the operations comprising determining (e.g., via the IAB node 400) that the first signals are associated with a first quality and the second signals are associated with a second quality, wherein the first quality is greater than the second quality. Based on the first quality being determined to be greater than the second quality, at element 904 the machine-readable medium can perform the operations comprising sending (e.g., via the IAB node 400), an indication of the first signals and initiating a transmission signal alignment in response to the sending the indication of the first signals.

Figure 10:
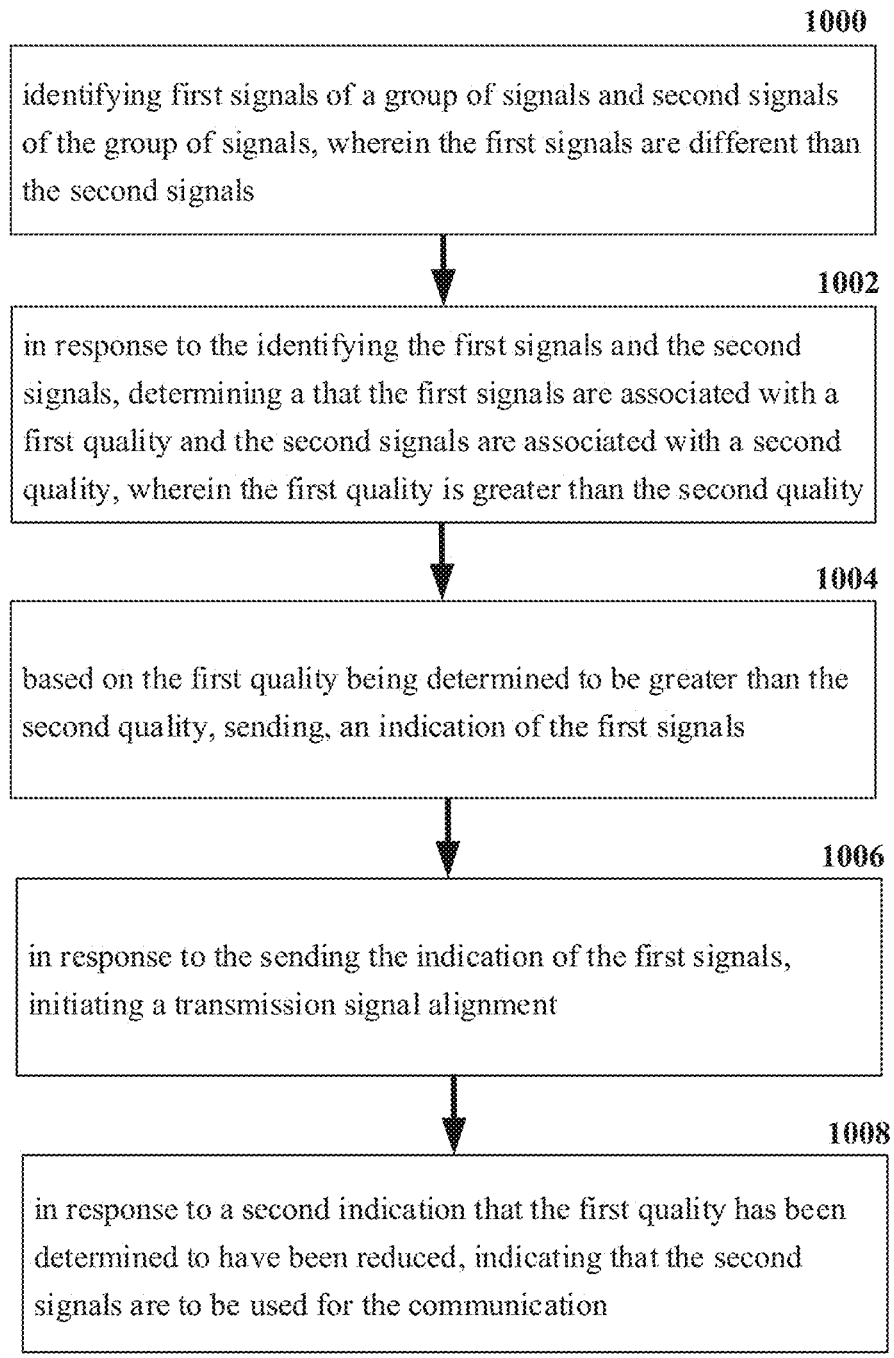
FIG. 10 illustrates an example flow diagram for a machine-readable medium for facilitation of signal alignment.

Referring now to FIG. 10, illustrates an example flow diagram for a machine-readable medium for facilitation of signal alignment. At element 1000, a machine-readable medium can perform the operations comprising identifying (e.g., via the IAB node 400) first signals of a group of signals and second signals of the group of signals, wherein the first signals are different than the second signals. In response to the identifying the first signals and the second signals, at element 1002 the machine-readable medium can perform the operations comprising determining (e.g., via the IAB node 400) that the first signals are associated with a first quality and the second signals are associated with a second quality, wherein the first quality is greater than the second quality. Based on the first quality being determined to be greater than the second quality, at element 1004 the machine-readable medium can perform the operations comprising sending (e.g., via the IAB node 400), an indication of the first signals and initiating a transmission signal alignment in response to the sending the indication of the first signals. Additionally, at element 1006, the machine-readable medium can perform the operations comprising indicating that the second signals are to be used for the communication in response to a second indication that the first quality has been determined to have been reduced.

Figure 11:
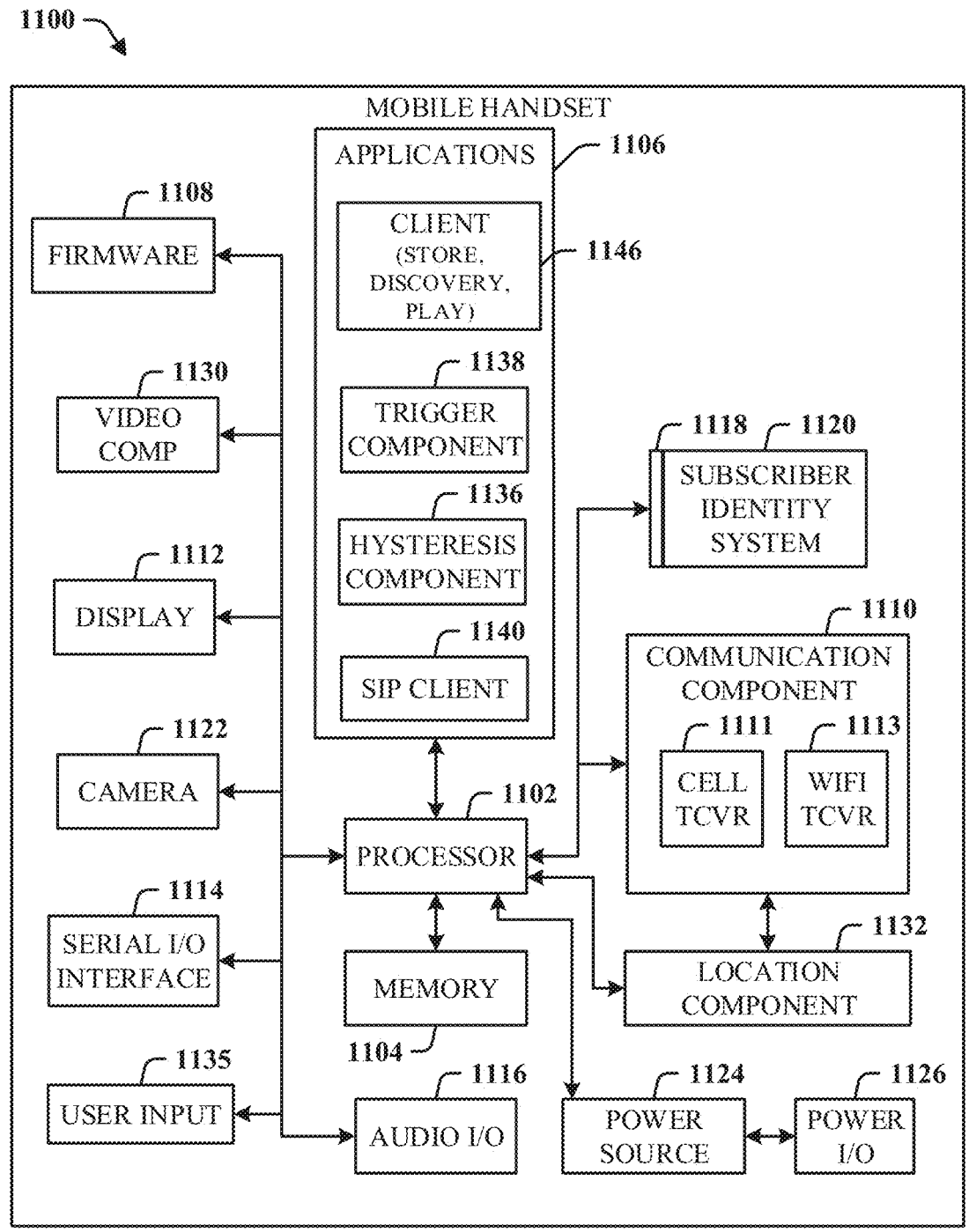
FIG. 11 illustrates an example block diagram of an example mobile handset operable to engage in a system architecture that facilitates secure wireless communication according to one or more embodiments described herein.

Referring now to FIG. 11, illustrated is a schematic block diagram of an exemplary end-user device such as a mobile device 1100 capable of connecting to a network in accordance with some embodiments described herein. Although a mobile handset 1100 is illustrated herein, it will be understood that other devices can be a mobile device, and that the mobile handset 1100 is merely illustrated to provide context for the embodiments of the various embodiments described herein. The following discussion is intended to provide a brief, general description of an example of a suitable environment 1100 in which the various embodiments can be implemented. While the description includes a general context of computer-executable instructions embodied on a machine-readable storage medium, those skilled in the art will recognize that the innovation also can be implemented in combination with other program modules and/or as a combination of hardware and software.

Generally, applications (e.g., program modules) can include routines, programs, components, data structures, etc., that perform particular tasks or implement particular abstract data types. Moreover, those skilled in the art will appreciate that the methods described herein can be practiced with other system configurations, including single-processor or multiprocessor systems, minicomputers, mainframe computers, as well as personal computers, hand-held computing devices, microprocessor-based or programmable consumer electronics, and the like, each of which can be operatively coupled to one or more associated devices.

A computing device can typically include a variety of machine-readable media. Machine-readable media can be any available media that can be accessed by the computer and includes both volatile and non-volatile media, removable and non-removable media. By way of example and not limitation, computer-readable media can comprise computer storage media and communication media. Computer storage media can include volatile and/or non-volatile media, removable and/or non-removable media implemented in any method or technology for storage of information, such as computer-readable instructions, data structures, program modules or other data. Computer storage media can include, but is not limited to, RAM, ROM, EEPROM, flash memory or other memory technology, CD ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The handset 1100 includes a processor 1102 for controlling and processing all onboard operations and functions. A memory 1104 interfaces to the processor 1102 for storage of data and one or more applications 1106 (e.g., a video player software, user feedback component software, etc.). Other applications can include voice recognition of predetermined voice commands that facilitate initiation of the user feedback signals. The applications 1106 can be stored in the memory 1104 and/or in a firmware 1108, and executed by the processor 1102 from either or both the memory 1104 or/and the firmware 1108. The firmware 1108 can also store startup code for execution in initializing the handset 1100. A communications component 1110 interfaces to the processor 1102 to facilitate wired/wireless communication with external systems, e.g., cellular networks, VoIP networks, and so on. Here, the communications component 1110 can also include a suitable cellular transceiver 1111 (e.g., a GSM transceiver) and/or an unlicensed transceiver 1113 (e.g., Wi-Fi, WiMax) for corresponding signal communications. The handset 1100 can be a device such as a cellular telephone, a PDA with mobile communications capabilities, and messaging-centric devices. The communications component 1110 also facilitates communications reception from terrestrial radio networks (e.g., broadcast), digital satellite radio networks, and Internet-based radio services networks.

The handset 1100 includes a display 1112 for displaying text, images, video, telephony functions (e.g., a Caller ID function), setup functions, and for user input. For example, the display 1112 can also be referred to as a "screen" that can accommodate the presentation of multimedia content (e.g., music metadata, messages, wallpaper, graphics, etc.). The display 1112 can also display videos and can facilitate the generation, editing and sharing of video quotes. A serial I/O interface 1114 is provided in communication with the processor 1102 to facilitate wired and/or wireless serial communications (e.g., USB, and/or IEEE 1394) through a hardwire connection, and other serial input devices (e.g., a keyboard, keypad, and mouse). This supports updating and troubleshooting the handset 1100, for example. Audio capabilities are provided with an audio I/O component 1116, which can include a speaker for the output of audio signals related to, for example, indication that the user pressed the proper key or key combination to initiate the user feedback signal. The audio I/O component 1116 also facilitates the input of audio signals through a microphone to record data and/or telephony voice data, and for inputting voice signals for telephone conversations.

The handset 1100 can include a slot interface 1118 for accommodating a SIC (Subscriber Identity Component) in the form factor of a card Subscriber Identity Module (SIM) or universal SIM 1120, and interfacing the SIM card 1120 with the processor 1102. However, it is to be appreciated that the SIM card 1120 can be manufactured into the handset 1100, and updated by downloading data and software.

The handset 1100 can process IP data traffic through the communication component 1110 to accommodate IP traffic from an IP network such as, for example, the Internet, a corporate intranet, a home network, a person area network, etc., through an ISP or broadband cable provider. Thus, VoIP traffic can be utilized by the handset 1100 and IP-based multimedia content can be received in either an encoded or decoded format.

A video processing component 1122 (e.g., a camera) can be provided for decoding encoded multimedia content. The video processing component 1122 can aid in facilitating the generation, editing and sharing of video quotes. The handset 1100 also includes a power source 1124 in the form of batteries and/or an AC power subsystem, which power source 1124 can interface to an external power system or charging equipment (not shown) by a power 110 component 1126.

The handset 1100 can also include a video component 1130 for processing video content received and, for recording and transmitting video content. For example, the video component 1130 can facilitate the generation, editing and sharing of video quotes. A location tracking component 1132 facilitates geographically locating the handset 1100. As described hereinabove, this can occur when the user initiates the feedback signal automatically or manually. A user input component 1134 facilitates the user initiating the quality feedback signal. The user input component 1134 can also facilitate the generation, editing and sharing of video quotes. The user input component 1134 can include such conventional input device technologies such as a keypad, keyboard, mouse, stylus pen, and/or touch screen, for example.

Referring again to the applications 1106, a hysteresis component 1136 facilitates the analysis and processing of hysteresis data, which is utilized to determine when to associate with the access point. A software trigger component 1138 can be provided that facilitates triggering of the hysteresis component 1138 when the Wi-Fi transceiver 1113 detects the beacon of the access point. A SIP client 1140 enables the handset 1100 to support SIP protocols and register the subscriber with the SIP registrar server. The applications 1106 can also include a client 1142 that provides at least the capability of discovery, play and store of multimedia content, for example, music.

The handset 1100, as indicated above related to the communications component 810, includes an indoor network radio transceiver 1113 (e.g., Wi-Fi transceiver). This function supports the indoor radio link, such as IEEE 802.11, for the dual-mode GSM handset 1100. The handset 1100 can accommodate at least satellite radio services through a handset that can combine wireless voice and digital radio chipsets into a single handheld device.

Figure 12:
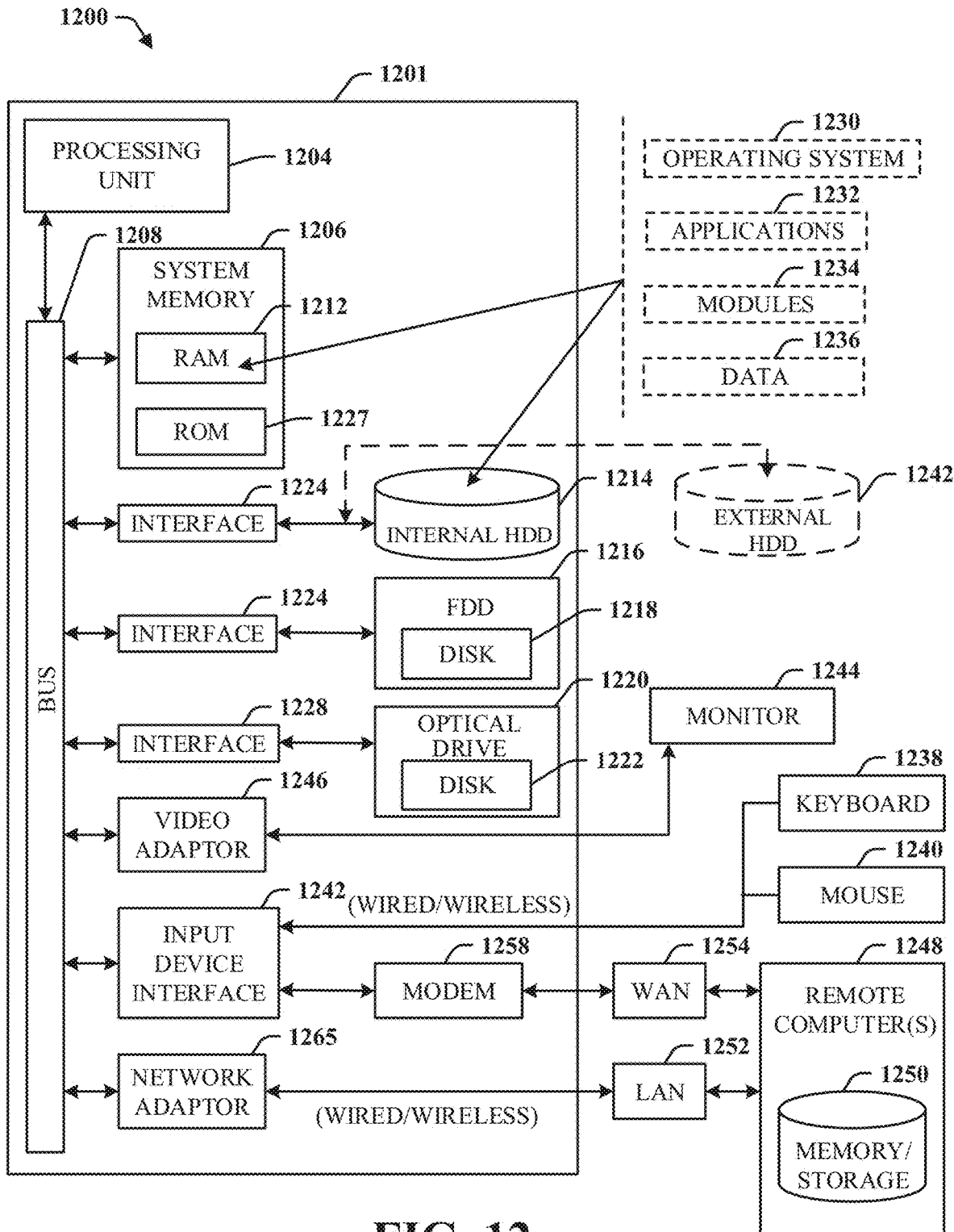
FIG. 12 illustrates an example block diagram of an example computer operable to engage in a system architecture that facilitates secure wireless communication according to one or more embodiments described herein.

Referring now to FIG. 12, there is illustrated a block diagram of a computer 1200 operable to execute a system architecture that facilitates establishing a transaction between an entity and a third party. The computer 1200 can provide networking and communication capabilities between a wired or wireless communication network and a server (e.g., Microsoft server) and/or communication device. In order to provide additional context for various aspects thereof, FIG. 12 and the following discussion are intended to provide a brief, general description of a suitable computing environment in which the various aspects of the innovation can be implemented to facilitate the establishment of a transaction between an entity and a third party. While the description above is in the general context of computer-executable instructions that can run on one or more computers, those skilled in the art will recognize that the innovation also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the various methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the innovation can also be practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media or communications media, which two terms are used herein differently from one another as follows.

Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data, or unstructured data. Computer-readable storage media can include, but are not limited to, RAM, ROM, EEPROM, flash memory or other memory technology, CD-ROM, digital versatile disk (DVD) or other optical disk storage, magnetic cassettes, magnetic tape, magnetic disk storage or other magnetic storage devices, or other tangible and/or non-transitory media which can be used to store desired information. Computer-readable storage media can be accessed by one or more local or remote computing devices, e.g., via access requests, queries or other data retrieval protocols, for a variety of operations with respect to the information stored by the medium.

Communications media can embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference to FIG. 12, implementing various aspects described herein with regards to the end-user device can include a computer 1200, the computer 1200 including a processing unit 1204, a system memory 1206 and a system bus 1208. The system bus 1208 couples system components including, but not limited to, the system memory 1206 to the processing unit 1204. The processing unit 1204 can be any of various commercially available processors. Dual microprocessors and other multi processor architectures can also be employed as the processing unit 1204.

The system bus 1208 can be any of several types of bus structure that can further interconnect to a memory bus (with or without a memory controller), a peripheral bus, and a local bus using any of a variety of commercially available bus architectures. The system memory 1206 includes read-only memory (ROM) 1227 and random access memory (RAM) 1212. A basic input/output system (BIOS) is stored in a non-volatile memory 1227 such as ROM, EPROM, EEPROM, which BIOS contains the basic routines that help to transfer information between elements within the computer 1200, such as during start-up. The RAM 1212 can also include a high-speed RAM such as static RAM for caching data.

The computer 1200 further includes an internal hard disk drive (HDD) 1214 (e.g., EIDE, SATA), which internal hard disk drive 1214 can also be configured for external use in a suitable chassis (not shown), a magnetic floppy disk drive (FDD) 1216, (e.g., to read from or write to a removable diskette 1218) and an optical disk drive 1220, (e.g., reading a CD-ROM disk 1222 or, to read from or write to other high capacity optical media such as the DVD). The hard disk drive 1214, magnetic disk drive 1216 and optical disk drive 1220 can be connected to the system bus 1208 by a hard disk drive interface 1224, a magnetic disk drive interface 1226 and an optical drive interface 1228, respectively. The interface 1224 for external drive implementations includes at least one or both of Universal Serial Bus (USB) and IEEE 1294 interface technologies. Other external drive connection technologies are within contemplation of the subject innovation.

The drives and their associated computer-readable media provide nonvolatile storage of data, data structures, computer-executable instructions, and so forth. For the computer 1200 the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer 1200, such as zip drives, magnetic cassettes, flash memory cards, cartridges, and the like, can also be used in the exemplary operating environment, and further, that any such media can contain computer-executable instructions for performing the methods of the disclosed innovation.

A number of program modules can be stored in the drives and RAM 1212, including an operating system 1230, one or more application programs 1232, other program modules 1234 and program data 1236. All or portions of the operating system, applications, modules, and/or data can also be cached in the RAM 1212. It is to be appreciated that the innovation can be implemented with various commercially available operating systems or combinations of operating systems.

A user can enter commands and information into the computer 1200 through one or more wired/wireless input devices, e.g., a keyboard 1238 and a pointing device, such as a mouse 1240. Other input devices (not shown) may include a microphone, an IR remote control, a joystick, a game pad, a stylus pen, touch screen, or the like. These and other input devices are often connected to the processing unit 1204 through an input device interface 1242 that is coupled to the system bus 1208, but can be connected by other interfaces, such as a parallel port, an IEEE 2394 serial port, a game port, a USB port, an IR interface, etc.

A monitor 1244 or other type of display device is also connected to the system bus 1208 through an interface, such as a video adapter 1246. In addition to the monitor 1244, a computer 1200 typically includes other peripheral output devices (not shown), such as speakers, printers, etc.

The computer 1200 can operate in a networked environment using logical connections by wired and/or wireless communications to one or more remote computers, such as a remote computer(s) 1248. The remote computer(s) 1248 can be a workstation, a server computer, a router, a personal computer, portable computer, microprocessor-based entertainment device, a peer device or other common network node, and typically includes many or all of the elements described relative to the computer, although, for purposes of brevity, only a memory/storage device 1250 is illustrated. The logical connections depicted include wired/wireless connectivity to a local area network (LAN) 1252 and/or larger networks, e.g., a wide area network (WAN) 1254. Such LAN and WAN networking environments are commonplace in offices and companies, and facilitate enterprise-wide computer networks, such as intranets, all of which may connect to a global communications network, e.g., the Internet.

When used in a LAN networking environment, the computer 1200 is connected to the local network 1252 through a wired and/or wireless communication network interface or adapter 1256. The adapter 1256 may facilitate wired or wireless communication to the LAN 1252, which may also include a wireless access point disposed thereon for communicating with the wireless adapter 1256.

When used in a WAN networking environment, the computer 1200 can include a modem 1258, or is connected to a communications server on the WAN 1254, or has other means for establishing communications over the WAN 1254, such as by way of the Internet. The modem 1258, which can be internal or external and a wired or wireless device, is connected to the system bus 1208 through the input device interface 1242. In a networked environment, program modules depicted relative to the computer, or portions thereof, can be stored in the remote memory/storage device 1250. It will be appreciated that the network connections shown are exemplary and other means of establishing a communications link between the computers can be used.

The computer is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

In the presence of a large number of antennas, a receiver can be inefficient. Thus, having the ability to sweep a smaller subset of the antennas is beneficial for a quick establishment of transmitter/receiver beam alignment. However, with dynamic time division duplexing (TDD), and in the presence of multiple hops in IAB, cross-link interference on access and backhaul links present a challenge and interference measurement and management solutions to mitigate the interference is needed. This disclosure proposed advantages over previous solutions that enables fast transmitter/receiver beam alignment in the presence of a large number of antennas at the receiver, takes into account the effect of cross link interference in choosing the right receiver beam at a victim node, allows the network to control the beam direction at the receiving node by indicating a subset of the Rx beams to be swept, and enables efficient power and time savings and interference reduction in IAB nodes via coordination between the network and the receiving IAB node.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the subject matter has been described herein in connection with various embodiments and corresponding FIGS., where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A method, comprising:
   receiving, from a user equipment by network equipment comprising a processor, information indicative of a network signal, wherein the receiving is via a gNodeB function of the network equipment;
   in response to receiving the information and based on a quality associated with the network signal, identifying, by the network equipment via the gNodeB function, the network signal as a first restricted signal associated with a first report configuration;
   in response to the identifying, sending, by the network equipment via the gNodeB function, a first indication representative of the network signal to a user equipment function of the network equipment;
   in response to the identifying, generating, by the network equipment via the gNodeB function, report configuration data representative of a second report configuration different than the first report configuration;
   in response to sending the first indication of the network signal, generating, by the network equipment via the gNodeB function, a second indication that the network signal is to be used for a transmission between a network signal transmission device and a network signal reception device, wherein a second restricted signal is identified, by the network equipment, as the network signal based on a quality of the second restricted signal being greater than a quality of the first restricted signal; and
   based on the second restricted signal and predictive data determined based on historical report data representative of a history of reception beam reports, repeating, by the network equipment via the gNodeB function, a transmission from the gNodeB function to the user equipment function of the network equipment.

2. The method of claim 1, wherein identifying the network signal is based on signal information associated with an antenna panel associated with a group of restricted signals.

3. The method of claim 2, further comprising:
identifying, by the network equipment, the group of restricted signals based on beam width data representative of a beam width associated with the group of restricted signals.

4. The method of claim 1, wherein the user equipment function facilitates a connection between the network equipment and lower order network equipment as opposed to higher order network equipment.

5. The method of claim 4, wherein the indication comprises a data bit indicating the group of restricted signals.

6. The method of claim 1, wherein the quality associated with the network signal is based on a signal interference to noise ratio of a group of restricted signals.

7. The method of claim 1, further comprising:
identifying, by the network equipment, the group of restricted signals based on an interfering node device associated with a group of network equipment.

8. The method of claim 1, wherein the repeating comprises repeating the transmission to the user equipment function based on identifying a group of restricted signals comprising the second restricted signal and the predictive data.

9. The method of claim 1, wherein a first group of restricted signals comprises the second restricted signal, and further comprising:
identifying, by the network equipment via the gNodeB function, a second group of restricted signals, wherein the second group of restricted signals is within the first group of restricted signals.

10. A system, comprising:
a processor; and
a memory that stores executable instructions that, when executed by the processor, facilitate performance of operations, comprising:
receiving information associated with a network signal of a group of network signals;
in response to receiving the information and based on a quality associated with the network signal, identifying the network signal as a first restricted signal associated with a first report configuration, and as having been received from a user equipment via a gNodeB function of network equipment;
in response to identifying the network signal, sending a first indication representative of the network signal to the network equipment;
in response to identifying the network signal, generating report configuration data representative of a second report configuration different than the first report configuration;
in response to sending the first indication of the network signal, generating a second indication that the network signal is to be used for a transmission between a network transmission device and a network reception device, wherein a second restricted signal is identified, by the network equipment, as the network signal based on a quality of the second restricted signal being greater than a quality of the first restricted signal; and
based on the second restricted signal and historical data representative of a history of reception beam reports utilized to predict future reception beams, repeating a transmission from the gNodeB function to a user equipment function of the network equipment.

11. The system of claim 10, wherein identifying the network signal is based on identifying a corresponding transmission device.

12. The system of claim 10, wherein the quality associated with the network signal comprises a quality metric representative of a reference signal received power.

13. The system of claim 10, wherein the quality associated with the network signal comprises a quality metric representative of a signal interference to noise ratio of the network signal.

14. The system of claim 10, wherein generating the second indication is in response to a prediction of the system based on a previous network signal of the group of network signals.

15. A non-transitory machine-readable medium, comprising executable instructions that, when executed by a processor, facilitate performance of operations, comprising:
identifying first signals of a group of signals and second signals of the group of signals, wherein the first signals are different than the second signals, wherein the first signals are first restricted signals, wherein identifying the first signals is based on an information bit indicative of the first signals, wherein information indicative of the first signals is received from a user equipment via a gNodeB function of network equipment, and wherein the first signals are associated with a first report configuration;
in response to identifying the first signals and the second signals, determining that the first signals are associated with a first quality and the second signals are associated with a second quality, wherein the first quality is greater than the second quality;
in response to determining that the first signals are associated with the first quality and the second signals are associated with the second quality, generating report configuration data representative of a second report configuration different than the first report configuration;
based on the report configuration data, sending an indication of the first signals from the gNodeB function to a user equipment function of the network equipment;
after sending the indication of the first signals, facilitating a transmission signal alignment associated with the gNodeB function; and
based on the second signals and historical data representative of a history of a reception beam report, repeating a transmission from the gNodeB function to the user equipment function of the network equipment.

16. The non-transitory machine-readable medium of claim 15, wherein the transmission signal alignment comprises indicating that the first signals are to be used for a communication.

17. The non-transitory machine-readable medium of claim 16, wherein the indication is a first indication, and wherein the operations further comprise:
in response to a second indication that the first quality has been determined to have been reduced, indicating that the second signals are to be used for the communication.

18. The non-transitory machine-readable medium of claim 17, wherein the second indication comprises a data bit indicating the second signals.

19. The non-transitory machine-readable medium of claim 15, wherein the first quality is based on a signal interference to noise ratio.

20. The non-transitory machine-readable medium of claim 15, wherein the first indication comprises a data bit indicating the first signals.

* * * * *